July 5, 1960

P. H. NAYLOR 2,944,144

ILLUMINATED POCKET LEVEL

Filed Feb. 14, 1958

INVENTOR.
PAUL H. NAYLOR,
BY
McMorrow, Berman & Davidson
ATTORNEYS.

July 5, 1960
P. H. NAYLOR
2,944,144
ILLUMINATED POCKET LEVEL
Filed Feb. 14, 1958
2 Sheets-Sheet 2
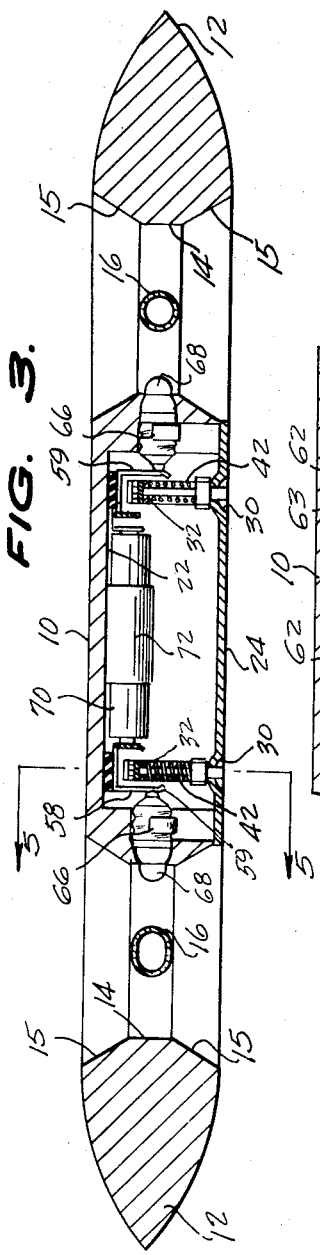
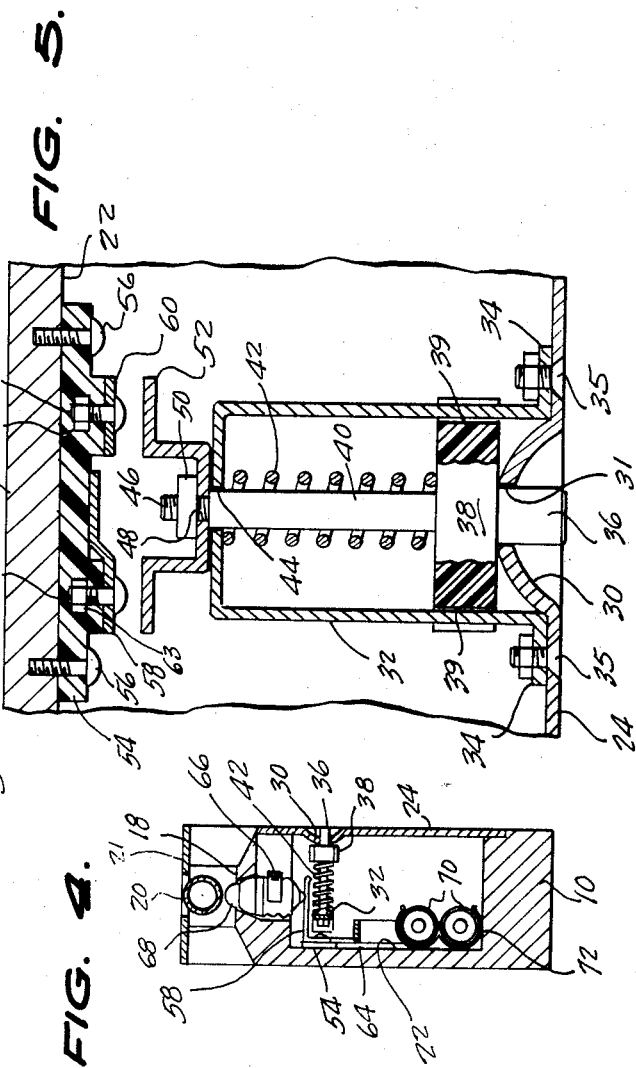
INVENTOR.
PAUL H. NAYLOR,
BY
McMorrow, Berman & Davidson
ATTORNEYS

2,944,144
ILLUMINATED POCKET LEVEL
Paul H. Naylor, Rte. 5, Fayette, Mo.
Filed Feb. 14, 1958, Ser. No. 715,310
2 Claims. (Cl. 240—6.44)

This invention relates generally to spirit levels, and more particularly has reference to a pocket or so-called "torpedo" level, that is a standard tool in use by electricians and other building craftsmen.

A level of the character described is ordinarily characterized by a notable disadvantage, in that it is very difficult to see the position of the bubble in a particular bubble tube thereof, in a relatively dark location. This is true, for example, in practicing such a trade as that of an electrician, who must install conduit pipe in perfectly horizontal positions in some instances, and in plumb or vertical positions in other instances, often in relatively inaccessible and darkened locations.

While illuminated levels are known in and of themselves, these have had certain disadvantages, as for example many of these have been comparatively expensive to make, and have not, even so, operated with full efficiency. In other instances, the levels have had the difficulty that the switch means for turning the power on or off has not been conveniently placed. Still further, selective illumination of different tubes of the level has not been possible in many levels heretofore devised, and in addition, expensive electrical connections, which are difficult to incorporate, in the level at a cost sufficiently low to make the same commercially feasible, have been required.

In view of the above, among important objects of the present invention are the following:

To incorporate in a small level of the pocket type means for illuminating a plurality of bubble tubes;

To so design said means as to permit the same to be manufactured and assembled at very low cost;

To permit selective illumination of the bubble tubes;

To so locate the means for illuminating the tubes that they can be operated while the level is held in a natural position, considering the tube that is to be observed;

To permit the use of various components which are conventional per se and which can be replaced at low cost, as for example conventional flashlight bulbs and small flashlight batteries; and To so incorporate the inventive features in the level as to permit the level to retain the outer configuration which is usual for levels of this type, with the invention further having the desirable characteristic of permitting swift access to all the inner components of the device for replacement, repair, or maintenance.

Other objects will appear in the following description, the claims appended thereto, and from the annexed drawing, in which like reference characters designate like parts throughout the several views, and wherein:

Figure 3 is a longitudinal sectional view on an enlarged scale taken on line 3—3 of Figure 1;

Figure 4 is a transverse sectional view on the same scale as Figure 2, taken substantially on line 4—4 of Figure 2;

Figure 5 is a still further enlarged, transverse sectional view substantially on line 5—5 of Figure 3.

Figure 1:
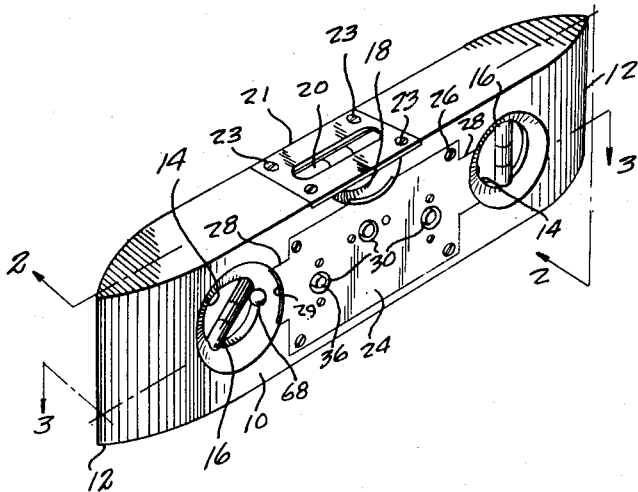
Figure 1 is a perspective view of a pocket level according to the present invention.

Referring to the drawing in detail, designated at 10 is an elongated body, which would be formed of cast aluminum or other electrically conductive material. At this point, it should be noted that materials and dimensions will not hereinafter be specified herein, except so far as critical to the invention, since it is not desired that the protection be limited to any materials or dimensions when these quite possibly might be varied.

In any event, the body 10 has the usual shape found in conventional pocket or torpedo levels such as are used by construction electricians and various other building craftsmen, said body having the tapered or pointed ends 12.

Formed in the body adjacent the respective ends 12 are large-diameter, transverse bubble tube spaces or openings 14 flaring as at 15 toward the opposite side surfaces of the body of the level. Purely for the purpose of promoting clarity of understanding, the openings 14 will be termed the end openings, and these are illuminated by flashlight bulbs in a manner to be described hereinafter. Mounted in the openings 14, in positions extending diametrically thereacross, are bubble tubes 16. The tube 16 in one opening 14 is disposed with its length perpendicular to the longitudinal center line of the level body. The other tube 16 is inclined at an angle of 45° from the line along which tube 16 is extended.

In the top surface of the level, there is provided an arcuate bubble tube space or recess 18 (see Figures 1 and 2) and extending across said recess with its ends engaged in the body 10 is a bubble tube 20, having its length aligned with the longitudinal center line of the body.

That bubble tube 16 shown at the right in Figure 1 would be used during vertical leveling, that is, for example, when a work piece is being plumbed or disposed perfectly vertically. The bubble tube 20 would be used during horizontal levelling and the bubble tube 16 shown at the left in Figure 1 would be used when the work piece is to extend at an angle of 45° from the vertical. These are the conventional, three bubble tubes that are ordinarily found in a pocket level such as used by electricians, since all leveling, for practical purposes, in this and many other building trades is done either vertically, horizontally, or at an angle of 45° from the vertical.

Securing the bubble tube 20 in place is a top plate 21, which is provided with corner screws 23 engaged in the level body. Plate 21 has a longitudinally and centrally extending slot providing a sight opening through which bubble tube 20 is viewed.

Opening upon one side surface of the level body between openings 14 is a deep, generally rectangular recess or cavity 22 normally closed by a cover plate 24 mounted in flush relation to the adjacent side surface and secured to the level body by rectangularly spaced screws 26 (Figure 1). Integral with and projecting in opposite directions from the ends of the cover plate 24 are extensions 28, the outer end surfaces of which are arcuately indented as at 29, and are registered with the adjacent edges of the openings 14.

With further reference to Figure 1, triangularly spaced, arcuate indentations 30 are formed in plate 24, in relatively closely spaced relation to the openings 14, 14, 18. Centrally formed in the indentations or recessed portions 30 are center openings 31.

Within the cavity 22, in position extending inwardly from each indented portion 30, are U-shaped yokes or frames 32 each of which (see Figure 5) is formed with oppositely, outwardly directed ears 34 having apertures registering with apertures of the plate 24, to receive small connecting bolts or equivalent fastener elements 35.

Recessed within the several indented portions 30 are push buttons 36, slidable in an axial direction within openings 31 and formed integrally with collars 38, having guide recesses 39 in which the sides of the yokes are slidably engaged. The collars are adapted to abut against the indented portions 30 in the normal, outwardly moved positions of the push buttons. Even in their outer positions, the push buttons at their free ends are disposed wholly within the indented portions, so as not to constitute projections which might snag on one's garments or which might cause accidental depression of the push buttons.

In any event, the push buttons and collars are rigid with elongated stems 40, surrounded by compression coil springs 42 bearing at their opposite ends against the collars 38 and the bight portions of the yokes 32, to normally extend the push buttons and dispose the stem 40 in the position shown in Figure 5. Stems 40, collars 38, and push buttons 36 may all be formed of plastic material or the like, in a preferred embodiment, to reduce the power drain on the batteries.

In any event, stems 40 at their inner ends are freely slidable in openings 44, and beyond the bight portions of the yoke, the stems are integral with reduced, threaded, axial extensions 46 on which are fitted contact or bridging plates 52 of electrically conductive material, said plates having offset intermediate portions apertured as at 48 to receive extensions 46. Nuts 50 are threaded on the extensions to hold the plates fixedly secured to the stems 40.

Figure 2:
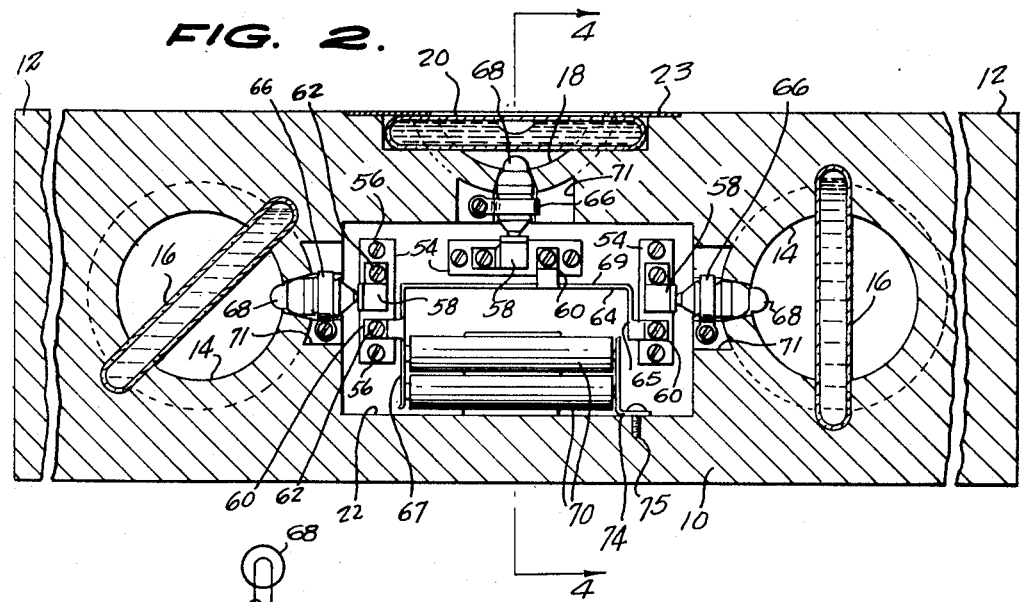
Figure 2 is an enlarged longitudinal sectional view therethrough, portions being broken away, on line 2—2 of Figure 1.

Referring to Figures 2 and 5, rectangular, elongated, generally flat spacer plates 54 of insulation material, such as molded plastic, are secured fixedly to the back wall of the recess 22 by means of screws 56. Protuberances are molded upon the respective plates 54, and supported thereupon are electrically conductive contacts 58, 60, secured to their associated plates 54 by screws 62 which are threaded in nuts 63 embedded in the plates. The screws 62 are of electrically conductive material, and are positioned for engagment by the ends of the several contacts 52 when the push buttons are depressed.

Each contact 58 has an angular extension, as shown at 59 in Figure 3, for a purpose to be described in detail hereinafter. Referring to Figure 2, the several contacts 60 are integral with an elongated, angularly shaped, electrically conductive bar 64, having end portions 65, 67 (see Figure 2) that are in perpendicular relation to an elongated intermediate portion 69. The several contacts 60 are secured one to the portion 67, a second to the portion 65, and a third to the portion 69.

A plurality of conductive straps 66 are secured in recesses 71 (Figure 2), that communicate between the cavity 22 and the several bubble tube openings. Straps 66 hold in place flashlight bulbs 68, with the straps contacting the conductive side walls of the bases, the center terminals of the flashlight bulb bases being engaged against the angular extensions 59 of the several contact plates 58.

Designated at 70 are conventional miniature flashlight batteries, having their center posts engaged against the portion 67. The batteries are held in place by a suitable clamp or bracket 72 (Figures 3 and 4). The casings of the batteries are engaged by contact lugs of an angular, electrically conductive bracket 74 secured by a screw 75 to the body of the level.

In use, when the level is held in a natural position during a particular leveling operation, one's hand will be disposed conveniently for depressing the push button 36 that is associated with the bubble tube that is to be illuminated during this operation. For example, assuming that horizontal leveling is being carried out, the level would be grasped in a manner such as to permit convenient depression of the middle push button 36, so as to illuminate the bubble tube 20.

Figure 6:
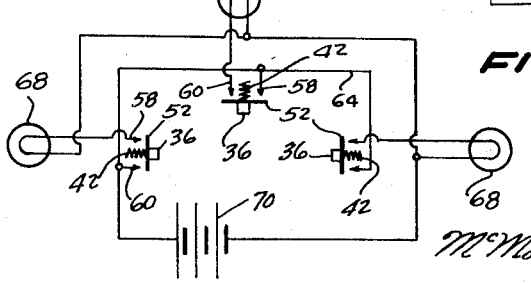
Figure 6 is a schematic illustration showing the wiring of the invention.

Assuming that the middle push button has been depressed, the bridging element 52 thereof will engage the contacts 58, 60 associated with the flashlight bulb that is disposed for illuminating said tube 20. As a result, and as will be readily seen from Figure 6, a circuit will be closed through this bulb and through the batteries.

The other bubble tubes are capable of being selectively illuminated with equal facility, and thus it will be apparent that by reason of the novel construction and arrangement illustrated and described herein, selective illumination of the bubble tubes of a pocket or torpedo level of conventional size and shape is permitted.

Another important characteristic of the invention resides in the fact that the level can be of a very small size, and even though equipped with the several push buttons, has no projections beyond the several faces or surfaces of the level. Still further, the particular switching arrangement illustrated and described has a desirable characteristics of facilitating manufacture of the device at a cost sufficiently low to justify commercial production thereof.

Another desirable feature of the invention resides in the fact that an exceedingly simple wiring arrangement is employed, which in point of actual fact includes no wires whatever, and comprises, in its entirety, a plurality of conductive elements readily secured in place within the cavity provided therefor. Still further, access to all the interior parts of the invention is provided merely by removal of the single cover plate, so that any flashlight bulb, battery, etc., can be replaced swiftly and easily.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An illuminated bubble level comprising an elongated substantially solid conductive body having first and second sides, a top side, and first and second ends, a relatively large rectangular chamber formed in said body midway between the ends thereof and opening to said first side, said chamber having a back wall at said second side, said chamber having end walls, a top wall, and a bottom wall, a longitudinal groove formed in said top side in registry with the chamber, an outwardly tapered bore formed in the chamber top wall and opening to said groove, first and second transverse openings extending through said body at points spaced between said chamber and said first and second ends of the body, outwardly tapered bores formed in the body and extending between the chamber end walls and related transverse openings, diametrical bubble tubes fixed in and extending across said transverse openings at differing angles, a horizontal bubble tube secured in and extending along said groove, electric bulbs engaged in said bores for illuming the bubble tubes when energized, and energizing means within said chamber, a cover plate removably secured to said first side of the body across the open side of the chamber, and individually operable switches having stationary contacts within said chamber connected to the energizing means and severally connected to one side of the bulbs, the other sides of the bulbs being grounded to the body, and movable manual contacts mounted on and insulated from the cover plate for selective engagement with stationary contacts.

2. An illuminated bubble level comprising an elongated substantially solid conductive body having first and second sides, a top side, and first and second ends, a relatively large rectangular chamber formed in said body midway between the ends thereof and opening to said first side, said chamber having a back wall at said second side, said chamber having end walls, a top wall, and a bottom wall, a longitudinal groove formed in said top side in registry with the chamber, an outwardly tapered bore formed in the chamber top wall and opening to said groove, first and second transverse openings extending through said body at points spaced between said chamber and said first and second ends of the body, outwardly tapered bores formed in the body and extending between the chamber end walls and related transverse openings, diametrical bubble tubes fixed in and extending across said transverse openings at differing angles, a horizontal bubble tube secured in and extending along said groove, electric bulbs engaged in said bores for illuming the bubble tubes when energized, and energizing means within said chamber, a cover plate removably secured to said first side of the body across the open side of the chamber, and individually operable switches having stationary contacts within said chamber connected to the energizing means and severally connected to one side of the bulbs, the other sides of the bulbs being grounded to the body, and movable manual contacts mounted on and insulated from the cover plate for selective engagement with stationary contacts, said energizing means comprising a battery mounted in the chamber, having a center contact and a casing contact at opposite ends, said battery extending longitudinally of the chamber, a conductor bar fixed to the chamber back wall and having an intermediate portion and end portions located near to and spaced from the stationary contacts, said movable contacts comprising outwardly spring-pressed buttons mounted through the cover plate and having inward ends, said movable contacts having bridges on their inward ends for electrically bridging related ones of said conductor bar portions and stationary contacts, said battery center contact being engaged with a part of the conductor bar, and conductive means grounded to the body and engaged with the casing contact of the battery.

References Cited in the file of this patent

UNITED STATES PATENTS

| | | |
|---|---|---|
| 948,570 | Andersen | Feb. 8, 1910 |
| 1,027,533 | Finn | May 28, 1912 |
| 1,169,005 | Caswell et al. | Jan. 18, 1916 |
| 1,177,211 | Ridpath | Mar. 28, 1916 |
| 1,705,425 | Swanson | Mar. 12, 1929 |
| 2,198,945 | Morris | Apr. 30, 1940 |
| 2,607,882 | Arnold | Aug. 19, 1952 |
| 2,615,122 | Coombs | Oct. 21, 1952 |
| 2,790,069 | Alexander | Apr. 23, 1957 |